(12) United States Patent
Freienmuth et al.

(10) Patent No.: US 11,629,812 B2
(45) Date of Patent: Apr. 18, 2023

(54) CONCENTRIC VIDEO ARM PIVOT MECHANISM

(71) Applicant: Safran Seats USA LLC, Gainesville, TX (US)

(72) Inventors: Eric O. Freienmuth, Marana, AZ (US); Matthew K. Zemler, Corinth, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/348,929

(22) PCT Filed: Jul. 28, 2017

(86) PCT No.: PCT/US2017/044290
§ 371 (c)(1),
(2) Date: May 10, 2019

(87) PCT Pub. No.: WO2018/089058
PCT Pub. Date: May 17, 2018

(65) Prior Publication Data
US 2019/0323649 A1    Oct. 24, 2019

Related U.S. Application Data

(60) Provisional application No. 62/420,220, filed on Nov. 10, 2016.

(51) Int. Cl.
*F16M 11/08*    (2006.01)
*F16M 11/10*    (2006.01)
(Continued)

(52) U.S. Cl.
CPC ............ *F16M 11/12* (2013.01); *F16M 11/08* (2013.01); *F16M 11/105* (2013.01); *F16M 13/02* (2013.01); *F16M 2200/066* (2013.01)

(58) Field of Classification Search
CPC .. F16M 11/10; F16M 11/105; F16M 11/2021; F16M 11/08; F16M 11/12; F16M 13/02; F16M 2200/066; B64D 11/00153
See application file for complete search history.

(56) References Cited

U.S. PATENT DOCUMENTS 4,494,177 A  *  1/1985  Matthews ............... F21V 21/26
                                                        362/402
4,770,384 A      9/1988  Kuwazima et al.
(Continued)

FOREIGN PATENT DOCUMENTS

CN        1644428 A      7/2005
CN      202320119 U      7/2012
(Continued)

OTHER PUBLICATIONS

International Patent Application No. PCT/US2017/044290, Search Report and Written Opinion, dated Nov. 3, 2017.
(Continued)

*Primary Examiner* — Muhammad Ijaz
*Assistant Examiner* — Guang H Guan
(74) *Attorney, Agent, or Firm* — Kilpatrick Townsend & Stockton LLP

(57) ABSTRACT

An articulating arm assembly for a passenger seat includes a static portion attachable to the passenger seat, a rotation portion attached to the static portion such that the rotation portion is pivotable about a rotation axis, an arm body attached to the rotation portion, such that the rotation portion and the arm body are movable between a stowed position and a deployed position, and a wiring portion disposed inside the arm body and extending from the arm body into the rotation portion. The wiring portion extends parallel to the rotation axis from the rotation portion toward and into the static portion.

8 Claims, 15 Drawing Sheets

(51) Int. Cl.
*F16M 11/12* (2006.01)
*F16M 13/02* (2006.01)

(56) References Cited

U.S. PATENT DOCUMENTS

| | | | | |
|---|---|---|---|---|
| 5,092,552 | A | * | 3/1992 | Dayton ................ F16M 13/00 248/278.1 |
| 5,179,447 | A | * | 1/1993 | Lain ................ B64D 11/00153 348/837 |
| 5,398,991 | A | | 3/1995 | Smith et al. |
| 5,709,360 | A | * | 1/1998 | Rosen .................... F16M 11/08 248/278.1 |
| 6,007,036 | A | * | 12/1999 | Rosen ................ B64D 11/0627 297/217.3 |
| 6,179,263 | B1 | * | 1/2001 | Rosen ................ B60R 11/0235 248/278.1 |
| 6,427,957 | B1 | * | 8/2002 | Finneman ............... B60N 3/002 248/185.1 |
| 6,517,040 | B1 | * | 2/2003 | Wen ........................ F16C 11/10 248/278.1 |
| 7,317,611 | B2 | * | 1/2008 | Dittmer ................. F16M 11/10 248/917 |
| 8,704,960 | B2 | * | 4/2014 | Weaver ............... B60R 11/0235 192/107 C |
| 9,010,852 | B1 | * | 4/2015 | Conrad ............... B60R 11/0229 297/135 |
| 9,617,001 | B2 | * | 4/2017 | Zimmermann .. B64D 11/00153 |
| 9,732,901 | B2 | * | 8/2017 | Satterfield ............ F16M 11/121 |
| 9,989,191 | B2 | * | 6/2018 | Parker ................ B60R 11/0235 |
| 10,752,181 | B2 | * | 8/2020 | Livingston Viswasam ................. B60R 11/0235 |
| 11,365,009 | B2 | * | 6/2022 | Gilbert ............... B64D 11/0639 |
| 2003/0161159 | A1 | | 8/2003 | Kupfer |
| 2005/0140191 | A1 | | 6/2005 | Curran et al. |
| 2010/0206999 | A1 | | 8/2010 | Li et al. |
| 2019/0323649 | A1 | * | 10/2019 | Freienmuth .......... F16M 11/105 |

FOREIGN PATENT DOCUMENTS

| | | |
|---|---|---|
| CN | 203587885 U | 5/2014 |
| CN | 204664775 U | 9/2015 |
| CN | 105516564 A | 4/2016 |
| DE | 9419315 U1 | 3/1995 |
| EP | 0255253 A2 | 2/1988 |
| EP | 0545691 A1 | 6/1993 |
| EP | 2543580 A1 | 1/2013 |
| EP | 3538809 B1 | 1/2021 |

OTHER PUBLICATIONS

China Patent Application No. 2017800695290, Office Action dated Jul. 21, 2020.
International Patent Application No. PCT/US2017/044290, International Preliminary Report on Patentability (Chapter I), dated May 23, 2019.
Europe Patent Application No. 17754876.5, Decision to grant a European patent pursuant to Article 97(1) EPC, dated Jan. 11, 2021, 2 pages.
China Patent Application No. 201780069529.0, Notice of Allowance and Search Report, dated May 20, 2021.

* cited by examiner

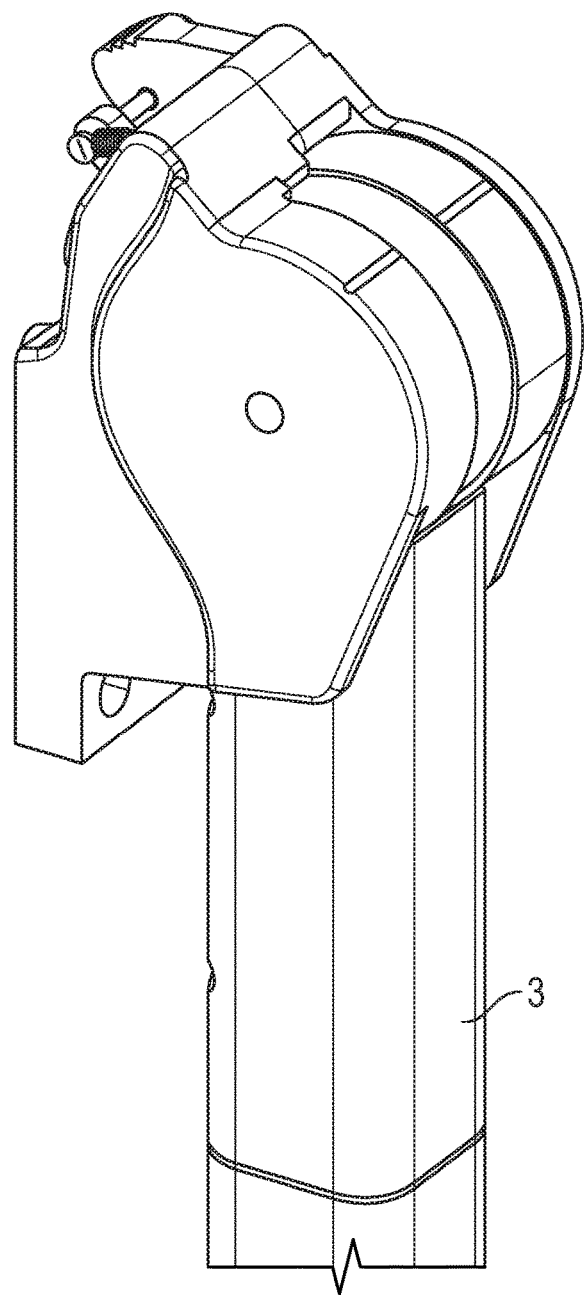
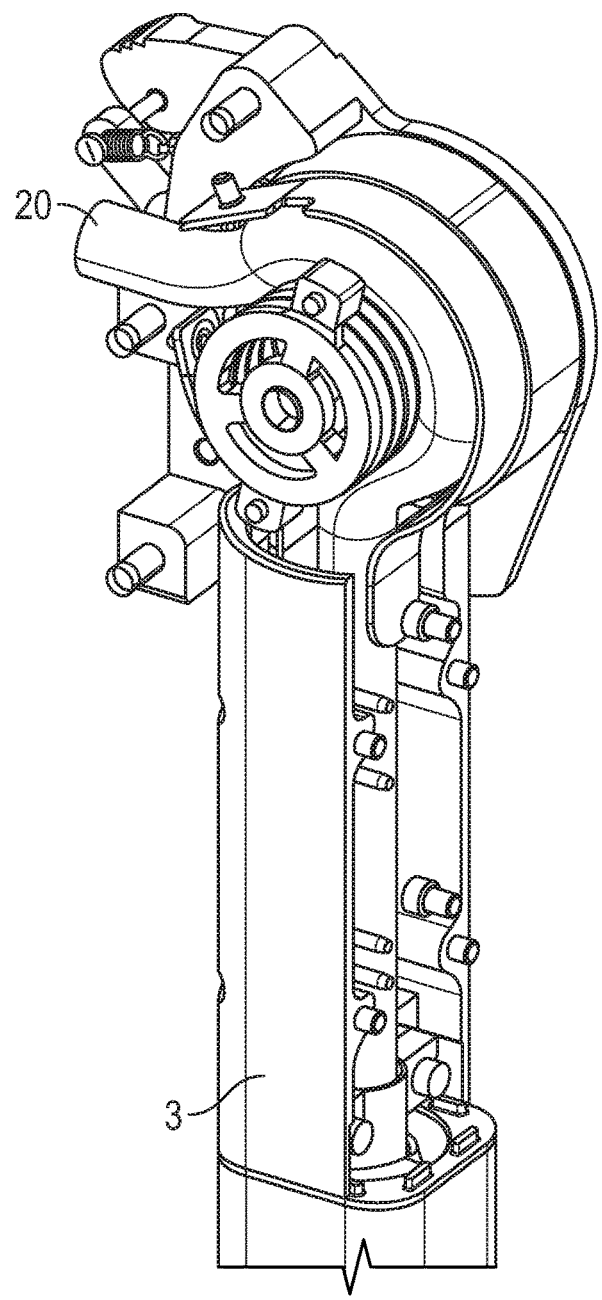
FIG. 12A
(Related Art)
FIG. 12B
(Related Art)

CONCENTRIC VIDEO ARM PIVOT MECHANISM

CROSS REFERENCE TO RELATED APPLICATION

This application is related to and claims priority benefit from U.S. Provisional Application No. 62/420,220 ("the '220 application"), filed on Nov. 10, 2016, entitled CONCENTRICALLY STRUCTURED VIDEO ARM ASSEMBLY UPPER JOINT. The '220 application is hereby incorporated in its entirety by this reference.

FIELD OF THE INVENTION

The field of the invention relates to pivoting arms for electronic components such as video screens for aircraft or the like.

BACKGROUND

In many instances, passenger vehicles, such as aircraft, buses, trains, ships, and automobiles, include passenger seats with a wide assortment of portable electronic and entertainment options to encourage passengers to remain seated as much as possible during transport for safety, crew mobility, and to enable efficient cabin service. Some passenger seats may provide video and/or audio entertainment, including television, video games, internet access, and other on-board entertainment ("OBE") or in-flight entertainment ("IFE") components. Many of these electronic devices are mounted in pivoting arms attached to the passenger seats such that a video screen and/or a receptacle and wired interface for a passenger's personal electronic device ("PED") are attached to the arm of the seat.

The electronic device (OBE, IFE, and/or PED) requires one or more articulating hinges and wires for connecting data and/or power sources to the electronic device. To this point, there have been very few examples of seat arms that sufficiently cover/conceal related wiring while also arranging the wiring to minimize deterioration while maximizing the life of the wiring components. Conventional seat assemblies typically require wires/cables to wrap around portions of the hinge assembly such that the wires/cables bend during movement of the arm, which causes durability problems.

In certain situations, it may be desirable to fully enclose all of the mechanical components and wires/cables within a seat arm, to arrange objects radially around the pivot of the hinge assembly, and to locate wires/cables to extend through the joint parallel (and/or coincident) with the axis of rotation.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an articulating arm assembly for a passenger seat comprises: a static portion attached to the passenger seat; a rotation portion attached to the static portion such that the rotation portion pivots about a rotation axis; an arm body attached to the rotation portion, the rotation portion and the arm body comprise a stowed position and a deployed position; and a wiring portion disposed inside the arm body and extending from the arm body into the rotation portion, wherein the wiring portion disposed such that it extends parallel to the rotation axis from the rotation portion toward and into the static portion.

The articulating arm assembly, in certain embodiments, further comprises a bearing disposed within an internal cavity of the rotation portion.

In some embodiments, the bearing comprises a one-way bearing that secures the rotation portion and the arm body in at least one of (i) the deployed position and (ii) a position between the stowed position and the deployed position.

The articulating arm assembly, in certain embodiments, further comprises a friction plate disposed between the static portion and the rotation portion.

In certain embodiments, the friction plate comprises an opening that is at least partially triangular.

In some embodiments, the friction plate comprises at least one trim ring that extends toward at least one of the static portion and the rotation portion.

The wiring portion, in certain embodiments, extends along an axis that is coincident with the rotation axis from the rotation portion toward and into the static portion.

In certain embodiments, the static portion comprises a main portion and a housing portion; and the housing portion comprises a recessed area that is at least partially cylindrical and approximately corresponds to an external surface of the rotation portion.

In some embodiments, the static portion comprises a plunger and at least one spring; and the at least one spring causes the plunger to push the rotation portion away from the stowed position.

The articulating arm assembly, in certain embodiments, further comprises a release mechanism wherein the release mechanism comprises a release pin disposed in the static portion such that a distal end of the release pin engages at least one hole of the rotation portion to secure the rotation portion and the arm body relative to the static portion.

In certain embodiments, the at least one hole of the rotation portion corresponds to the stowed position.

According to certain embodiments of the present invention, a passenger seat comprises: an articulating arm assembly comprising a stowed position and a deployed position, wherein the articulating arm assembly comprises: a static portion; a rotation portion attached to the static portion such that the rotation portion pivots about a rotation axis; an arm body attached to the rotation portion, wherein the rotation portion and the arm body rotate about the rotation axis relative to the static portion; and a wiring portion disposed inside the arm body and extending from the arm body into the rotation portion, wherein the wiring portion disposed such that it extends parallel to the rotation axis from the rotation portion toward and into the static portion.

In certain embodiments, the articulating arm assembly further comprises a bearing disposed within an internal cavity of the rotation portion.

The bearing, in certain embodiments, comprises a one-way bearing that secures the rotation portion and the arm body in at least one of (i) the deployed position and (ii) a position between the stowed position and the deployed position.

In certain embodiments, the articulating arm assembly further comprises a friction plate disposed between the static portion and the rotation portion.

The friction plate, in certain embodiments, comprises at least one of: an opening that is at least partially triangular; and at least one trim ring that extends toward at least one of the static portion and the rotation portion.

In some embodiments, the wiring portion extends along an axis that is coincident with the rotation axis from the rotation portion toward and into the static portion.

In certain embodiments, the static portion comprises a main portion and a housing portion; and the housing portion comprises a recessed area that is at least partially cylindrical and approximately corresponds to an external surface of the rotation portion.

The static portion, in certain embodiments, comprises a plunger and at least one spring; and the at least one spring causes the plunger to push the rotation portion away from the stowed position.

In some embodiments, the articulating arm assembly further comprises a release mechanism, wherein the release mechanism comprises a release pin disposed in the static portion such that a distal end of the release pin engages at least one hole of the rotation portion to secure the rotation portion and the arm body relative to the static portion.

BRIEF DESCRIPTION OF THE DRAWINGS

FIGS. 12A and 12B are partial perspective views of a conventional articulating arm assembly.

DETAILED DESCRIPTION

Figure 1A:
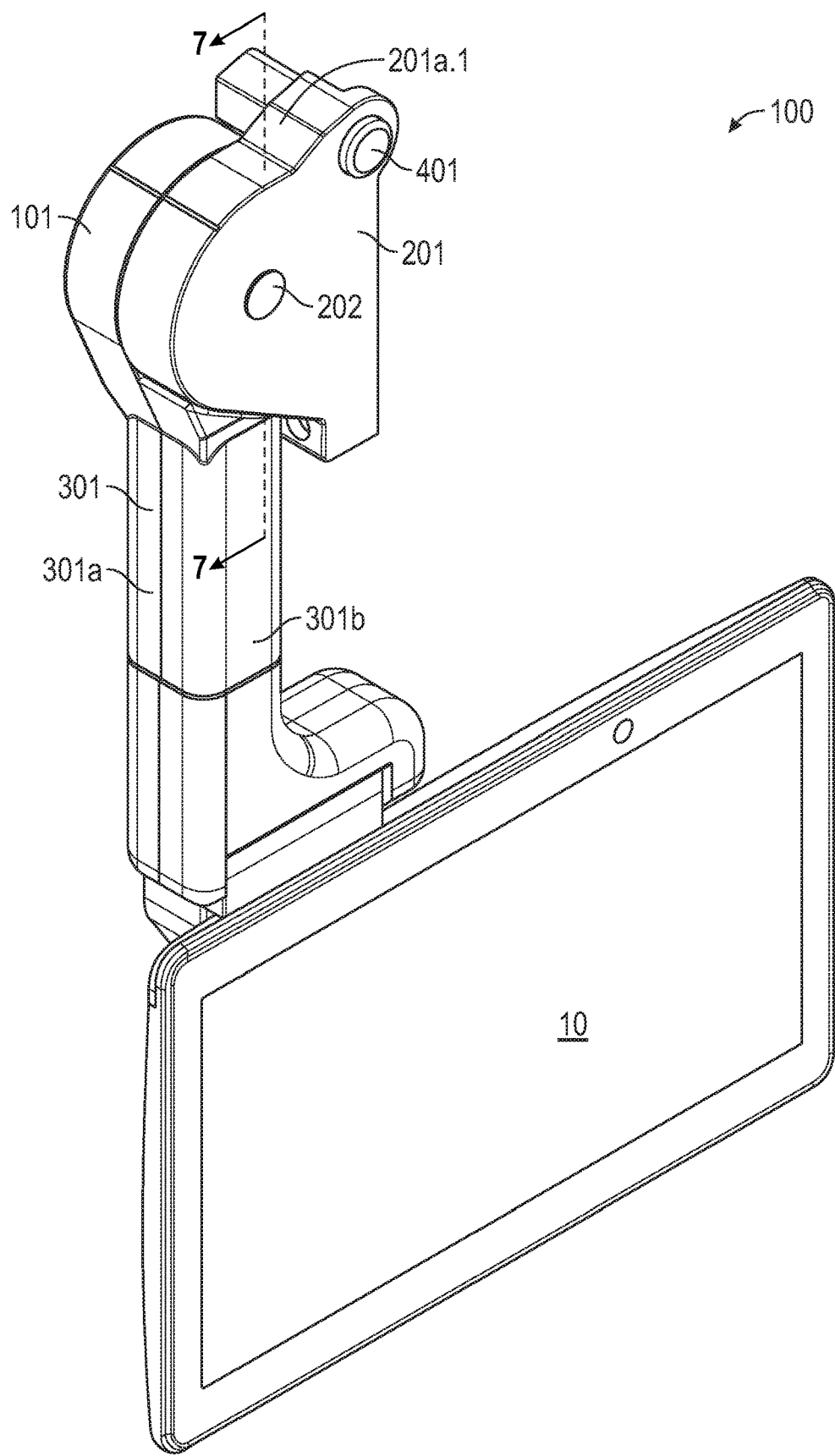
FIG. 1A is a front left perspective view of an articulating arm assembly in a stowed configuration according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1A-11B illustrate embodiments of articulating arm assemblies for passenger seats where the articulating arm assemblies are configured to support at least one electronic device 10. The electronic device 10 may be a video screen, light, communication device, computer screen, tablet, mobile phone, or any other appropriate device. In these embodiments, the articulating arm assembly 100 may include at least a rotation portion 101, a static portion 201, and an arm body 301.

Figure 1B:
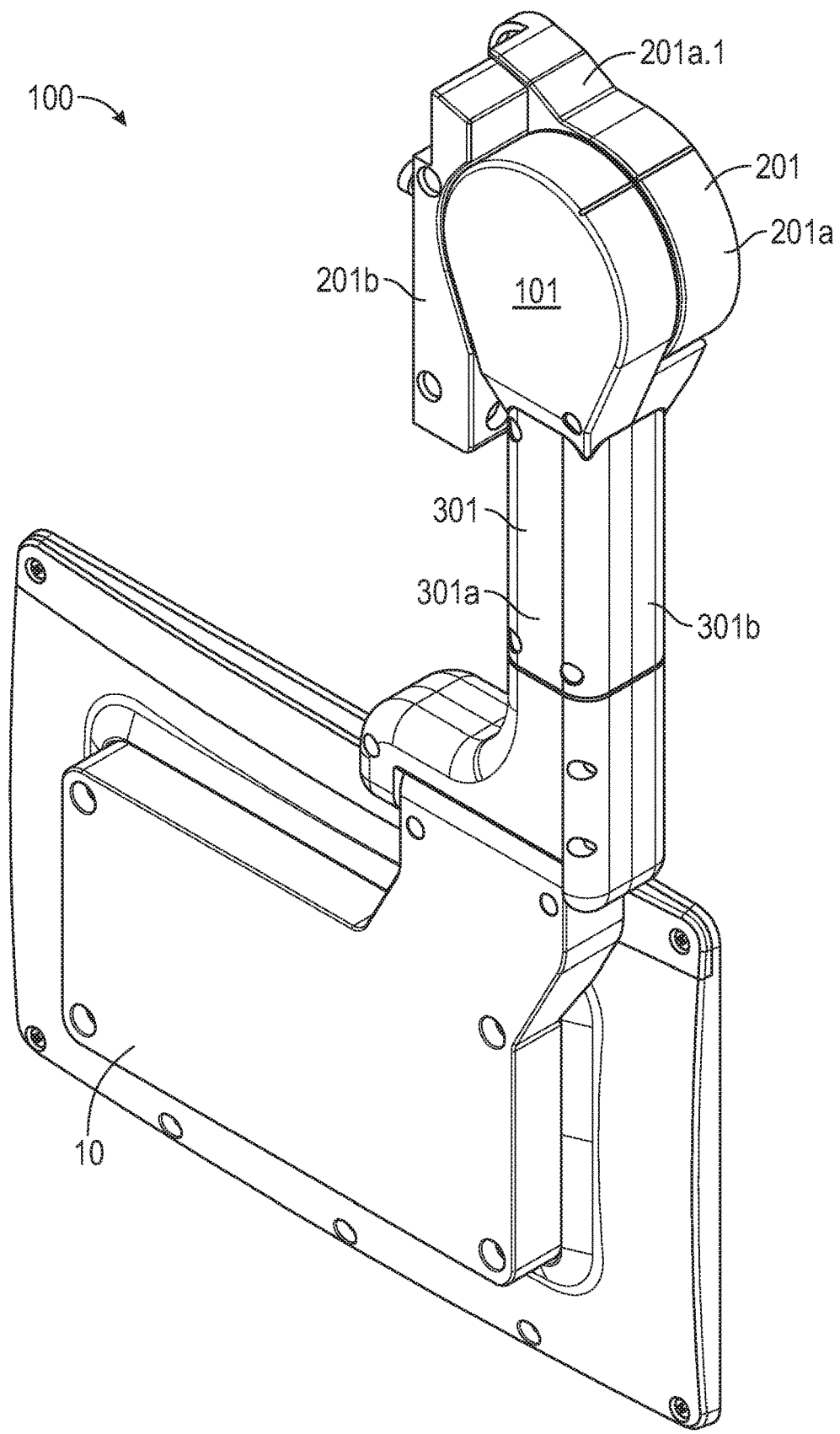
FIG. 1B is a front right perspective view of the articulating arm assembly of FIG. 1A.

FIGS. 1A and 1B show front and rear views of the articulating arm assembly 100 in a stowed configuration, respectively. As shown in FIG. 1A, the static portion 201 may include a cover 202 and a release portion 401. The rotation portion 101 (see FIG. 1B) is attached to arm body 301, which may include a first portion 301a and a second portion 301b. The static portion 201 may include a main portion 201a and a housing portion 201b. When the arm body 301 moves/rotates, the end surface 301b.1 of the second portion 301b moves adjacent to the outer surface of the main portion 201a.

Figure 2:
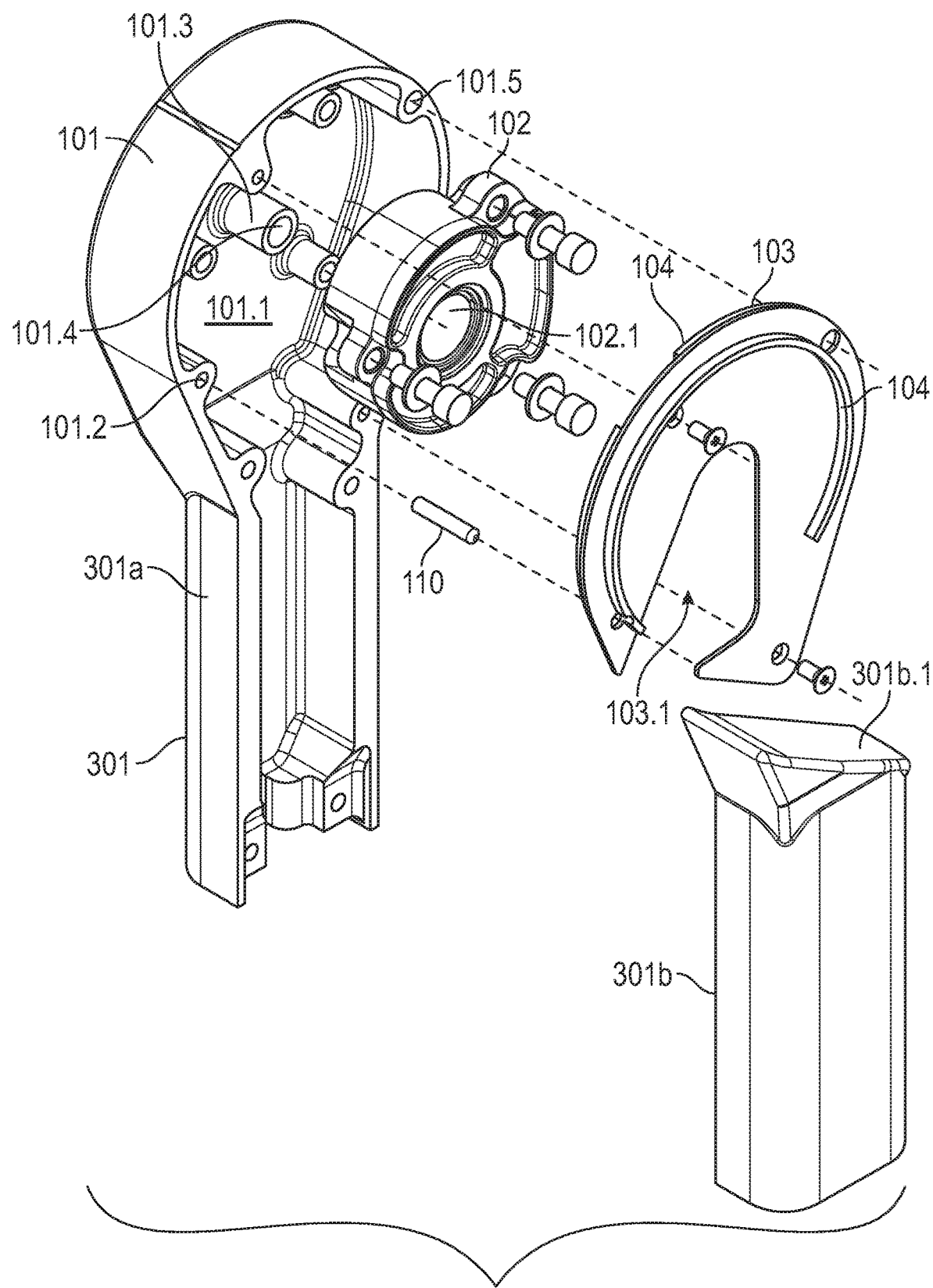
FIG. 2 is a partial perspective exploded view of the articulating arm assembly of FIG. 1A.
Figure 3:
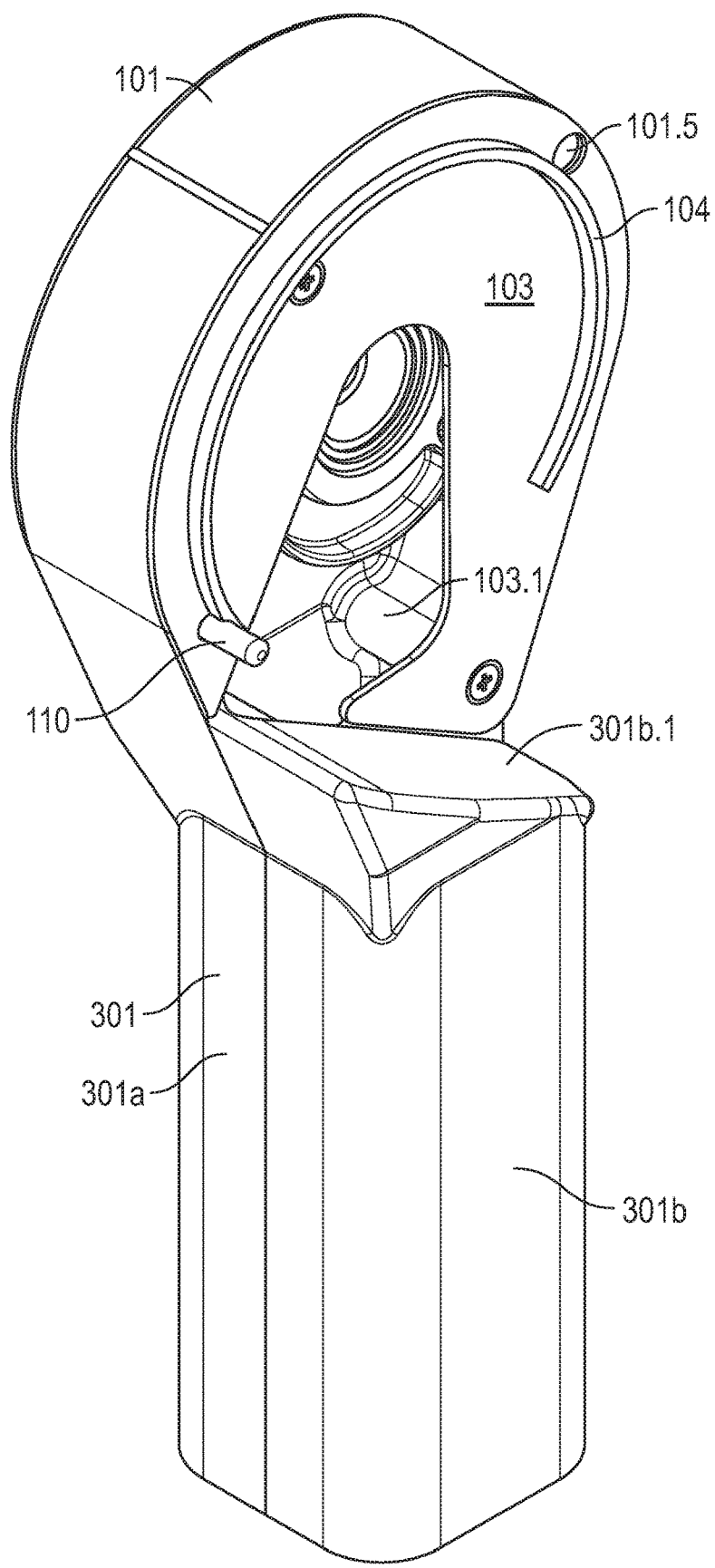
FIG. 3 is a partial perspective assembled view of the articulating arm assembly of FIG. 1A.

The dynamic components of the articulating arm assembly 100 are shown in an exploded view in FIG. 2 and in an assembled view in FIG. 3. The rotation portion 101 includes an internal cavity 101.1 that is approximately cylindrical. A stop pin 110 may be inserted into hole 101.2 of the rotation portion 101. When the rotation portion 101 and the arm body 301 rotate relative to the static portion 201, the stop pin 110 engages the raised portion 201a.1 of the main portion 201a to limit rotation (see FIGS. 5, 6, 8, 9). A bearing 102 may be inserted into the internal cavity 101.1 as shown in FIG. 2. In some embodiments, the rotation portion 101 may include a protrusion 101.3 that engages a center hole 102.1 of the bearing 102. The bearing 102 may be a one-way bearing. As shown in FIGS. 2 and 3, a friction plate 103 is attached to the surface of rotation portion 101 that interfaces with static portion 201. The friction plate 103 covers and helps secure the bearing 102 while providing a low-friction surface for interfacing with static portion 201.

Figure 6:
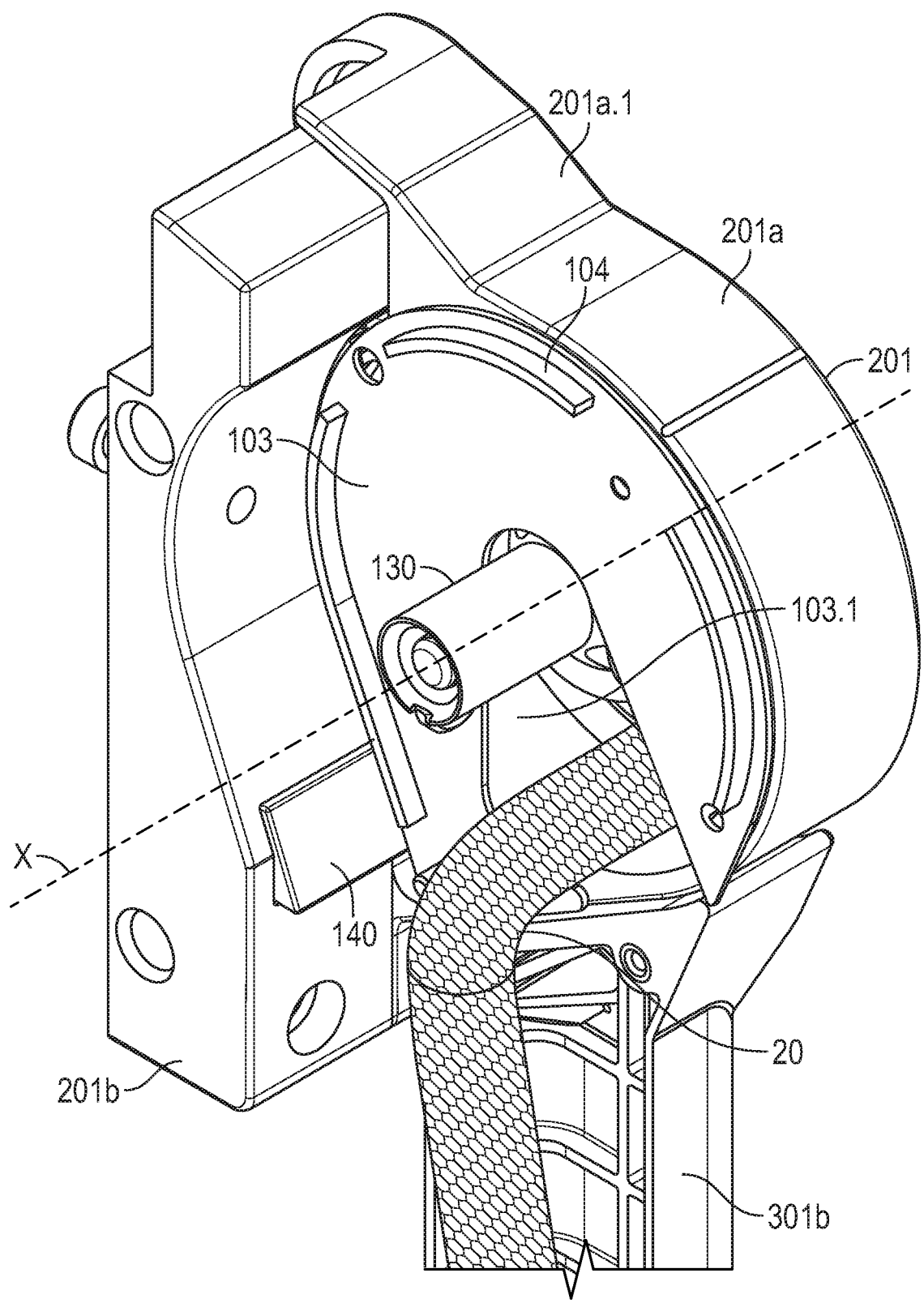
FIG. 6 is a partial perspective view of the articulating arm assembly of FIG. 1A.
Figure 7:
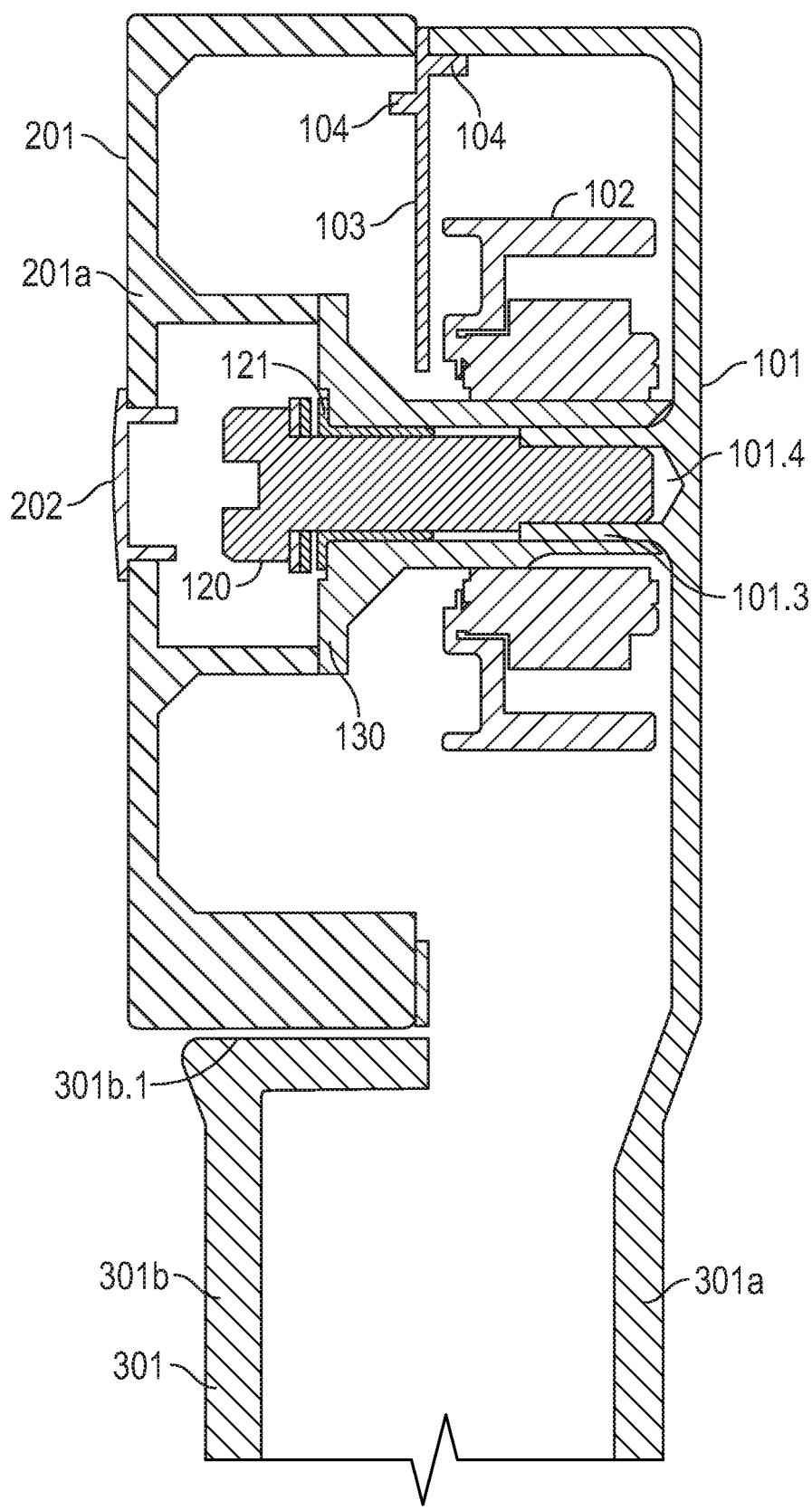
FIG. 7 is partial cross section view of the articulating arm assembly of FIG. 1A.
Figure 8:
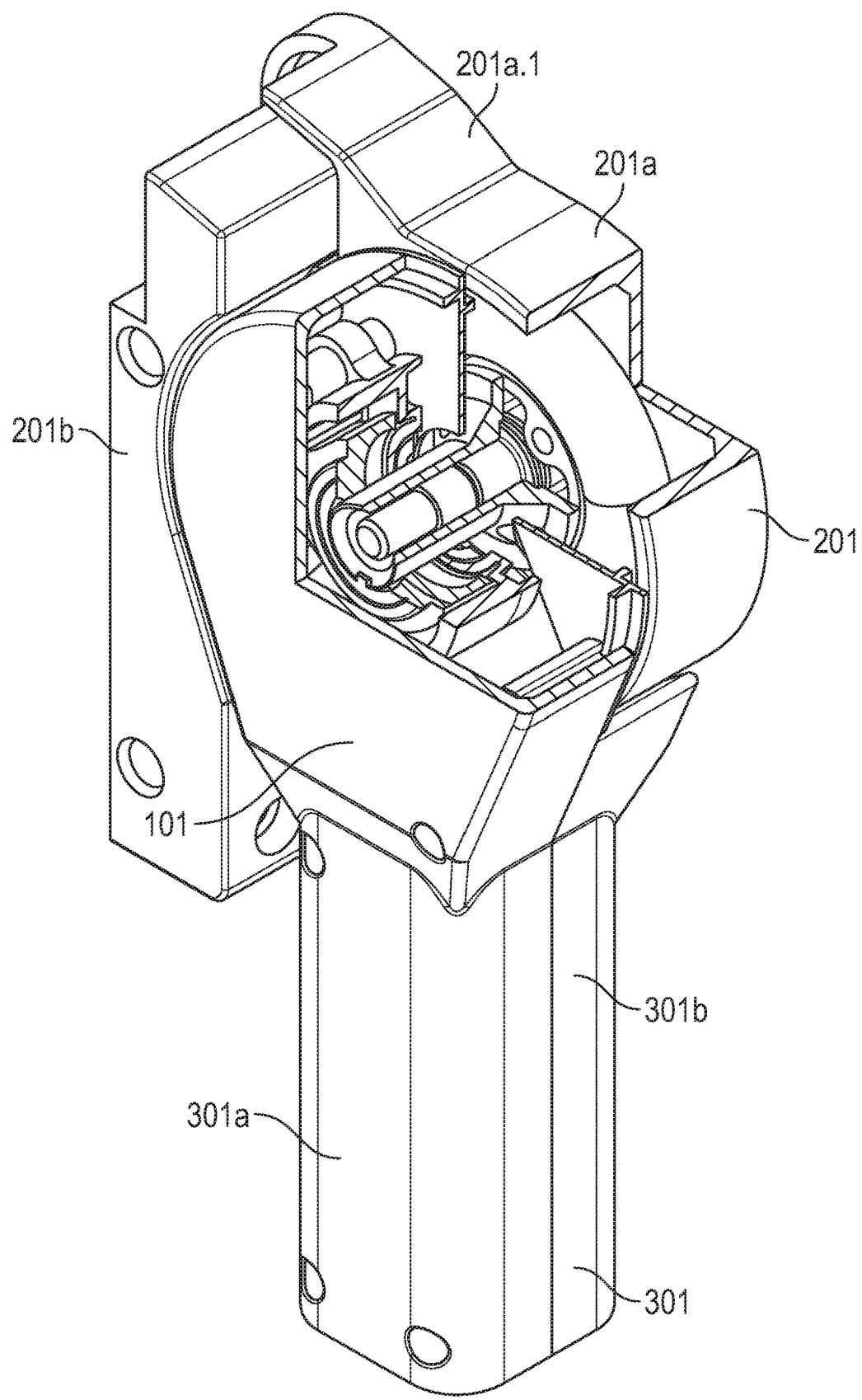
FIG. 8 is a partial perspective cutaway view of the articulating arm assembly of FIG. 1A.

The friction plate 103 may include at least one trim ring 104 that extends from a surface of the friction plate 103 toward the rotation portion 101, toward the static portion 201, or in both directions. The at least one trim ring 104 may have a rectangular cross section (or any other appropriate shape) and may extend in a radial direction partially or fully around the surface of the friction plate 103. The at least one trim ring 104 may include at least one gap between portions thereof. For example, as shown in FIGS. 2 and 6, the trim ring 104 extending toward the rotation portion 101 may include at least one gap between portions thereof. As shown in FIG. 7, at least a portion of the trim ring 104 extending toward the rotation portion 101 may interface with an inner surface of the circumferential portion of the rotation portion 101. Although not illustrated, the at least one trim ring 104 may interface with an inner surface of the circumferential portion of the static portion 201. The mechanical interface between the at least one trim ring 104 and the inner surface of the rotation portion 101 and/or the static portion 201 accomplishes one or more of the following: (1) ensures alignment between the adjacent components (i.e., alignment between the friction plate 103 and the rotation portion 101 and/or the static portion 201), (2) limits exposure to and/or seals the internal cavity from the environment (i.e., reduces the dirt, moisture, foreign objects, etc. that enter the internal cavities), (3) covers/obscures any gap (when viewed radially) between the friction plate 103 and an adjacent component (i.e., the rotation portion 101 and/or the static portion 201), and (4) increases the strength and/or rigidity of the friction plate 103. The friction plate 103 may also include an opening 103.1. The shape of opening 103.1 is configured such that wiring 20 passes through the opening 103.1 and that friction plate 103 can be removed/replaced from the articulating arm assembly 100 without damaging or removing the wiring 20. As shown in FIGS. 2 and 3, at least part of the opening 103.1 includes a triangular shape.

Figure 4:
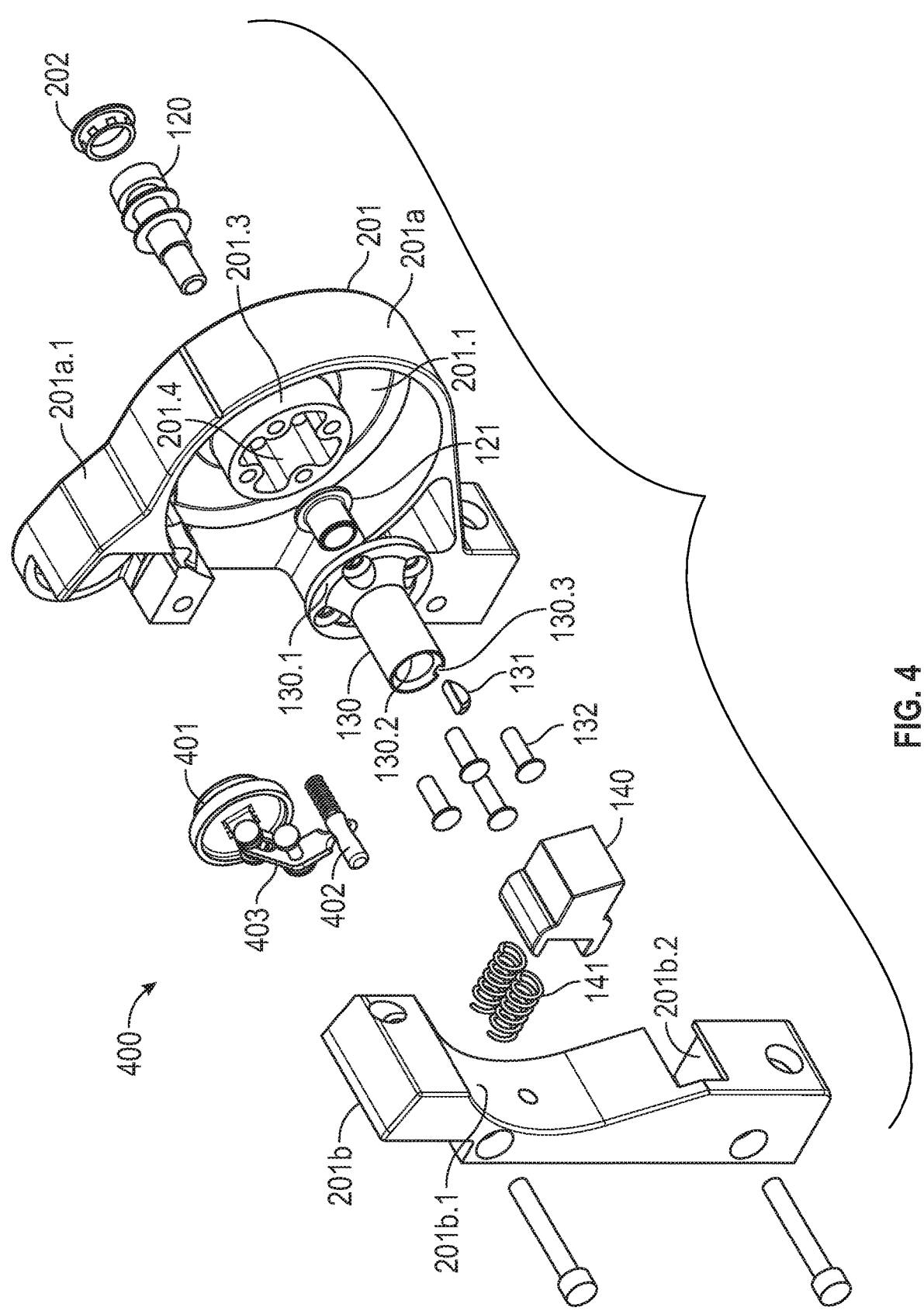
FIG. 4 is a partial perspective exploded view of the articulating arm assembly of FIG. 1A.
Figure 5:
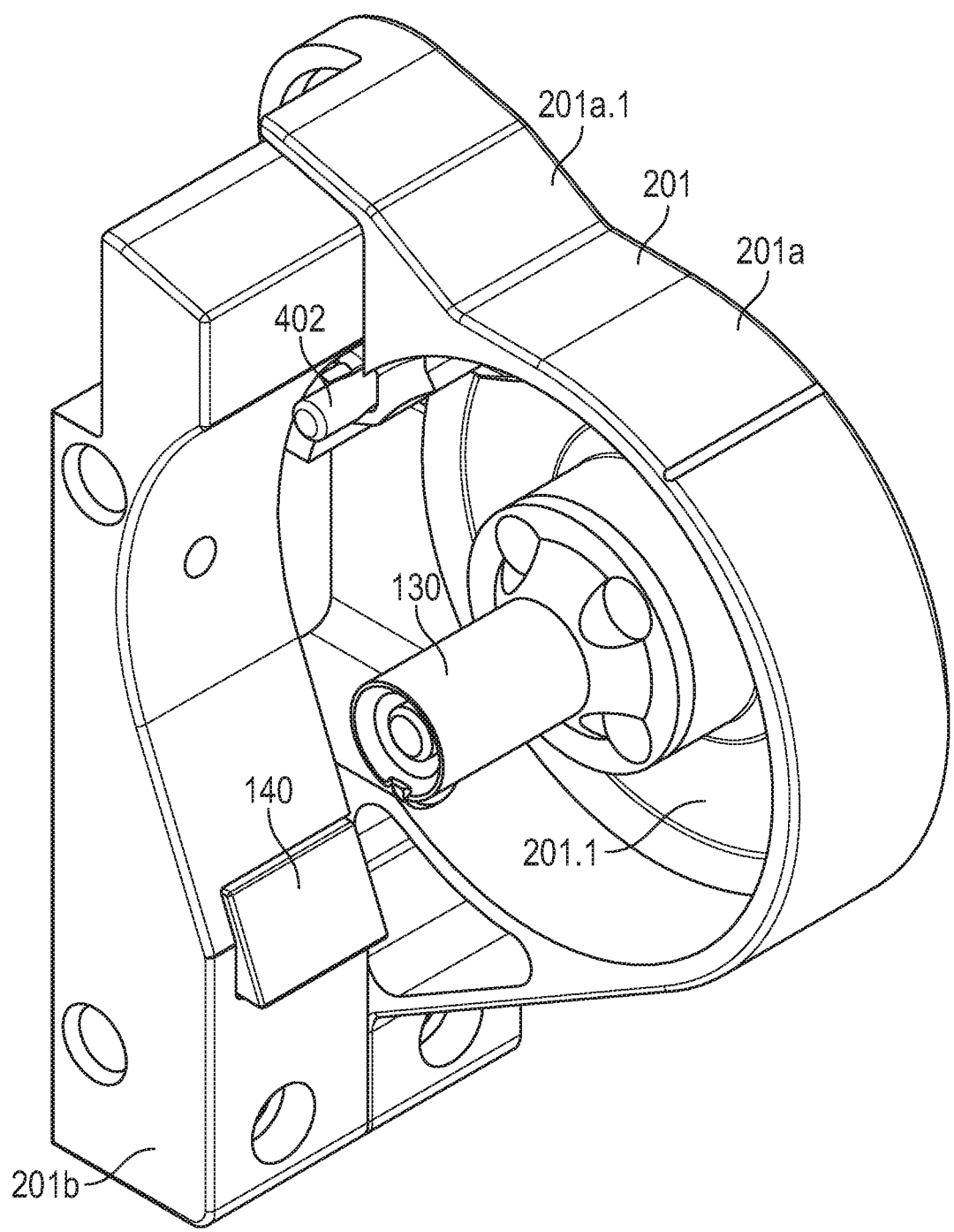
FIG. 5 is a partial perspective assembled view of the articulating arm assembly of FIG. 1A.

FIGS. 4 and 5 show exploded and assembled views of the static portion 201 and some of its related components, respectively. The static portion 201 includes an internal cavity 201.1 that is approximately cylindrical. A pin 130 may be inserted into the internal cavity 201.1 as shown in FIG. 4. In some embodiments, the static portion 201 may include a protrusion 201.3 that engages a surface of the pin 130. In some embodiments, the protrusion 201.3 includes a center hole 201.4 that is non-cylindrical. The pin 130 may include a flange 130.1 that attaches to the protrusion 201.3 using at least one fastener 132. As shown in FIG. 4, the pin 130 may include a key 131 that engages channel 130.3 such that the key 131 limits movement of the bearing 102 relative to the pin 130 when the components are assembled.

Figure 10A:
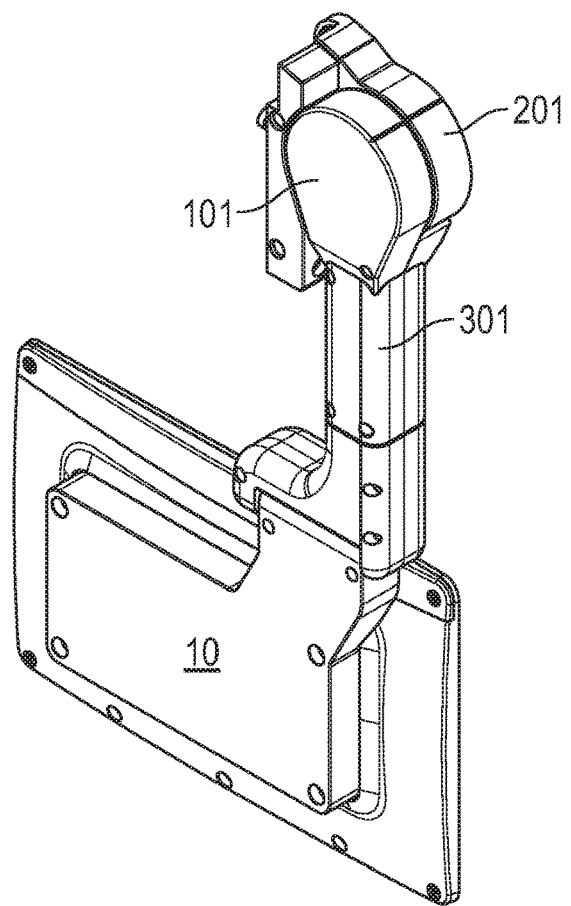
FIG. 10A is a perspective view of the articulating arm assembly of FIG. 1A in the stowed position.
Figure 10B:
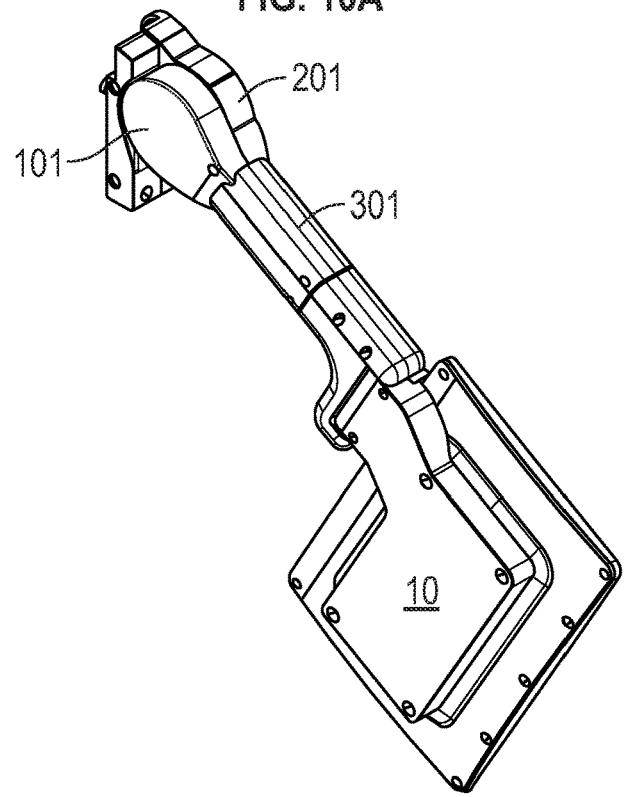
FIGS. 10B, 10C, 10D, and 10E are perspective views of the articulating arm assembly of FIG. 1A in intermediate positions between the stowed position and the deployed position.
Figure 10C:
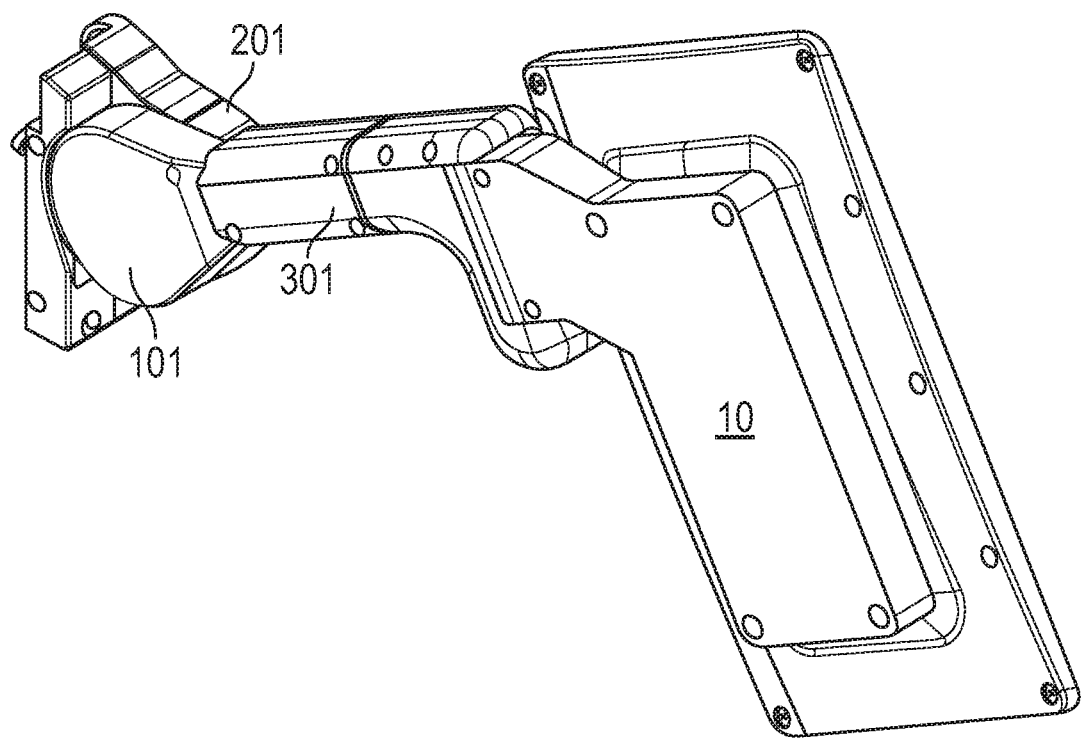
Figure 10D:
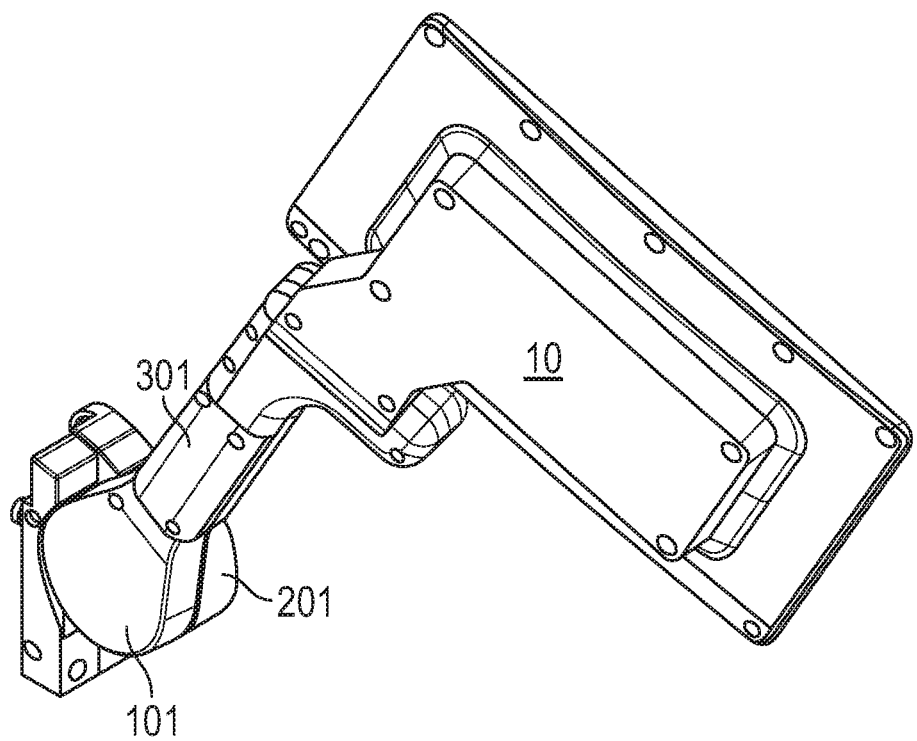
Figure 10E:
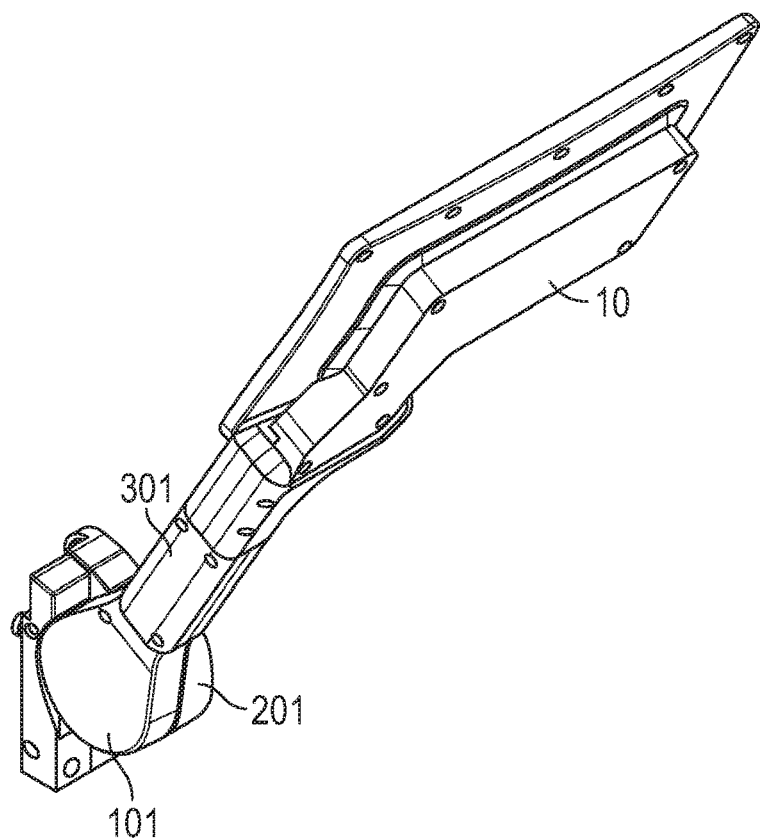
Figure 10F:
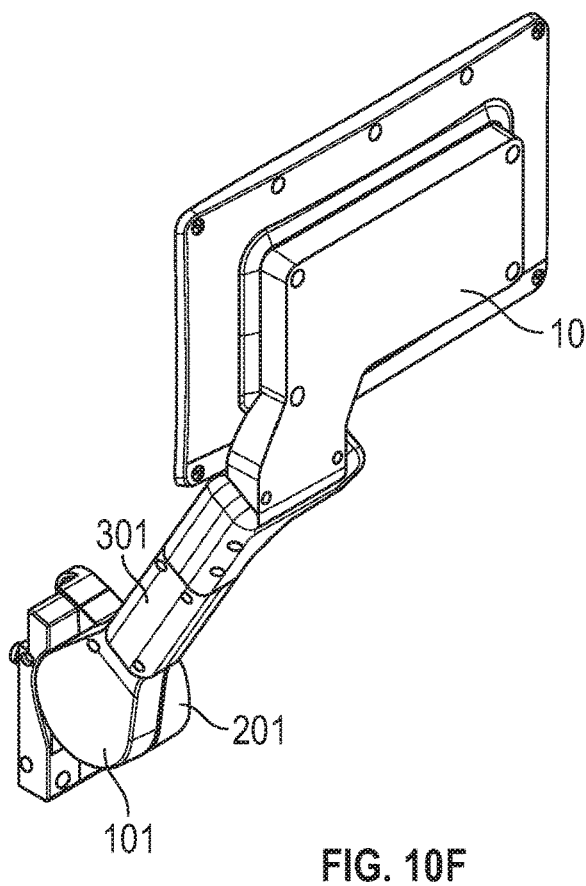
FIG. 10F is a perspective view of the articulating arm assembly of FIG. 1A in the deployed position.

A release mechanism 400 may include a linkage 403 that connects the release portion 401 and a release pin 402. The release portion 401 may include a mechanical button (as illustrated), a toggle or slider switch, an electronically controlled switch, or any other appropriate button/switch. The linkage 403 may include at least one spring to bias the release pin 402 toward at least one of an extended position and/or a retracted position. When the rotation portion 101 is rotated to the stowed position (see FIGS. 1A, 1B, and 10A), the extended position of the release pin 402 causes a distal end of the release pin 402 to engage hole 101.5 of the rotation portion 101, which secures the articulating arm assembly 100 in the stowed position. The release pin 402 may engage other hole(s) corresponding to other positions (i.e., not stowed). In some embodiments, in lieu of or in addition to the other holes configured to engage the release pin 402, the bearing 102 is a one-way bearing configured to hold the arm body 301 in a non-stowed position (i.e., to prevent gravity from causing the arm body 301 to rotate toward the stowed position). The one-way bearing 102 may hold the arm body 301 (and the rotation portion 101) in the deployed position or in one of a plurality of positions between the stowed position and the deployed position. For example, FIG. 10F shows the deployed position, and FIGS. 10B-10E show four examples of positions between the stowed position and the deployed position.

In some embodiments, the articulating arm assembly 100 includes a fastener 120 that extends through at least (1) center hole 201.4 (of static portion 201), (2) hole 130.2 (of pin 130), (3) center hole 102.1 (of bearing 102), and (4) center hole 101.4 (of rotation portion 101). As shown in FIG. 7, in some embodiments, the fastener 120 engages threads in center hole 101.4 of the rotation portion 101. The fastener 120 may also extend through a low-friction bearing 121 (see FIGS. 4 and 7). A cover 202 may attach to an exterior surface of the static portion 201 to cover an access hole for the head of the fastener 120 (see FIGS. 1A, 4, and 7). In some embodiments, the fastener 120 is a shoulder bolt.

The housing portion 201b of the static portion 201 may be a separate component that is attached to the main portion 201a (as shown in the drawings) or may be an integral component of the static portion 201. The housing portion 201b may include a recessed area 201b.1 that is at least partially cylindrical that corresponds to part of the rotation portion 101. As shown in FIG. 4, the housing portion 201b may also include a cavity 201b.2 such that at least one spring 141 and plunger 140 are located within the cavity 201b.2. Due to compression of the at least one spring 141, the plunger 140 pushes the rotation portion 101 (along with the arm body 301 and other related components) away from the stowed position toward the deployed position when the release mechanism 400 causes the release pin 402 to disengage from hole 101.5 (i.e., causes the dynamic components of the articulating arm assembly 100 to rotate relative to the static components to prevent reengagement of release pin 402 with hole 101.5). In other words, when the release pin 402 engages hole 101.5 (i.e., the stowed position as shown in FIG. 10A), the plunger 140 is compressed against the at least one spring 141 such that approximately the entire (or at least a majority of) plunger 140 is disposed within cavity 201b.2.

Figure 9:
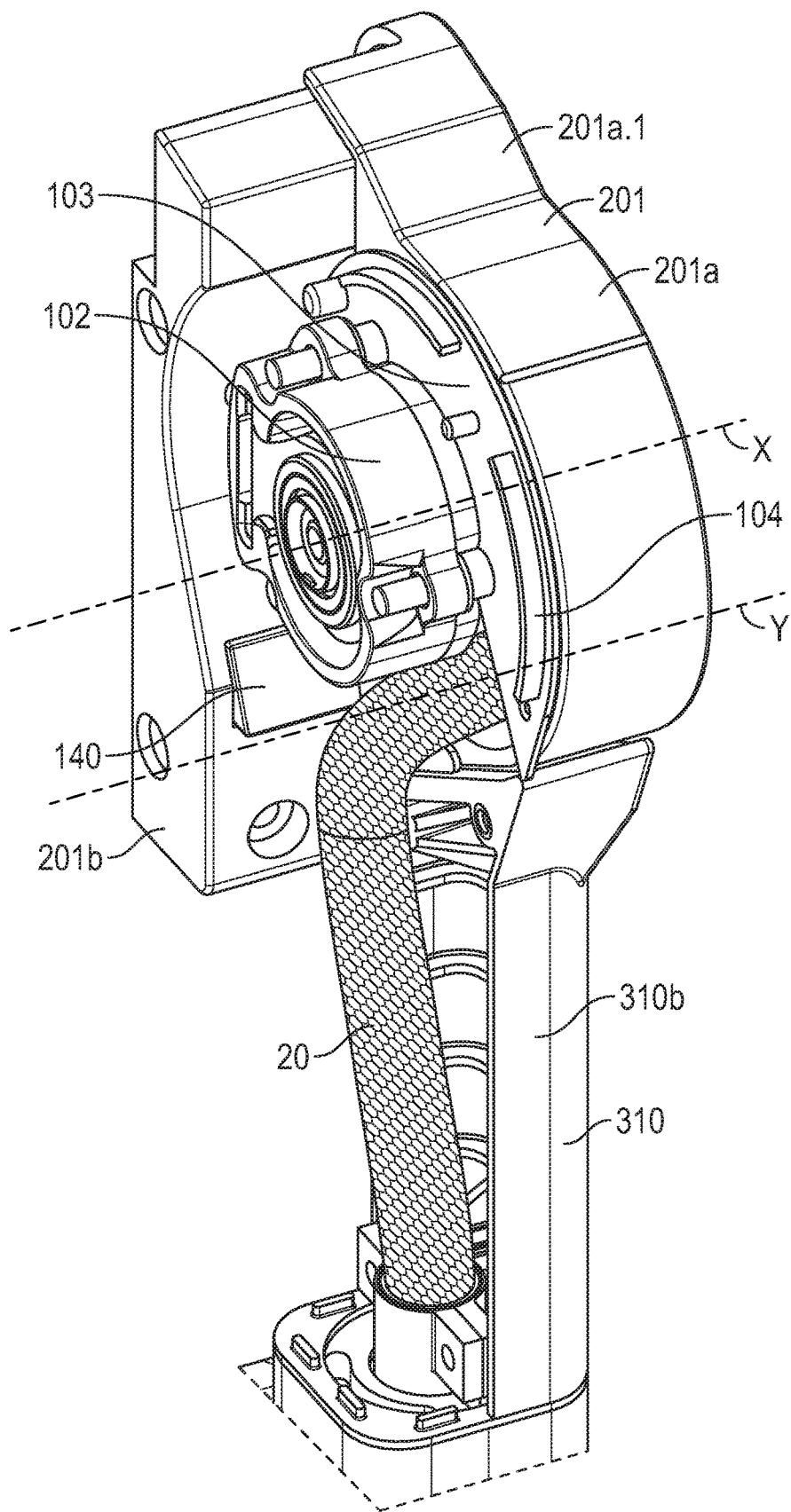
FIG. 9 is a partial perspective view of the articulating arm assembly of FIG. 1A.
Figure 11A:
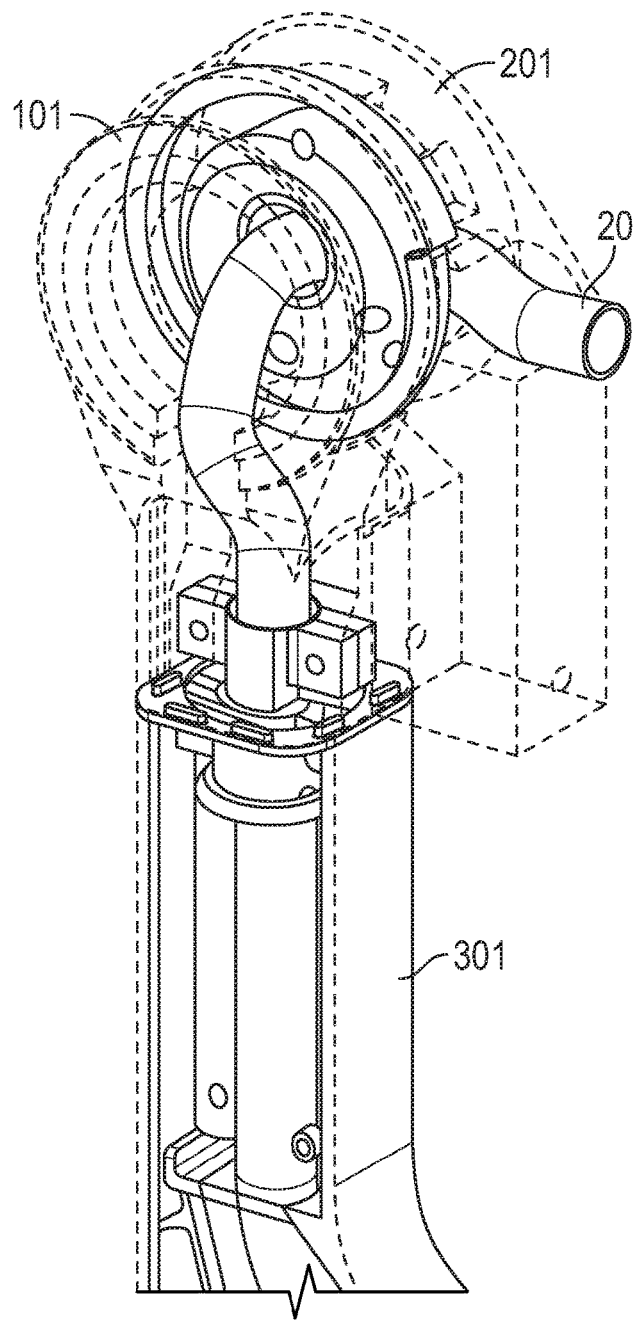
FIG. 11A is a partial perspective view of the articulating arm assembly of FIG. 1A.
Figure 11B:
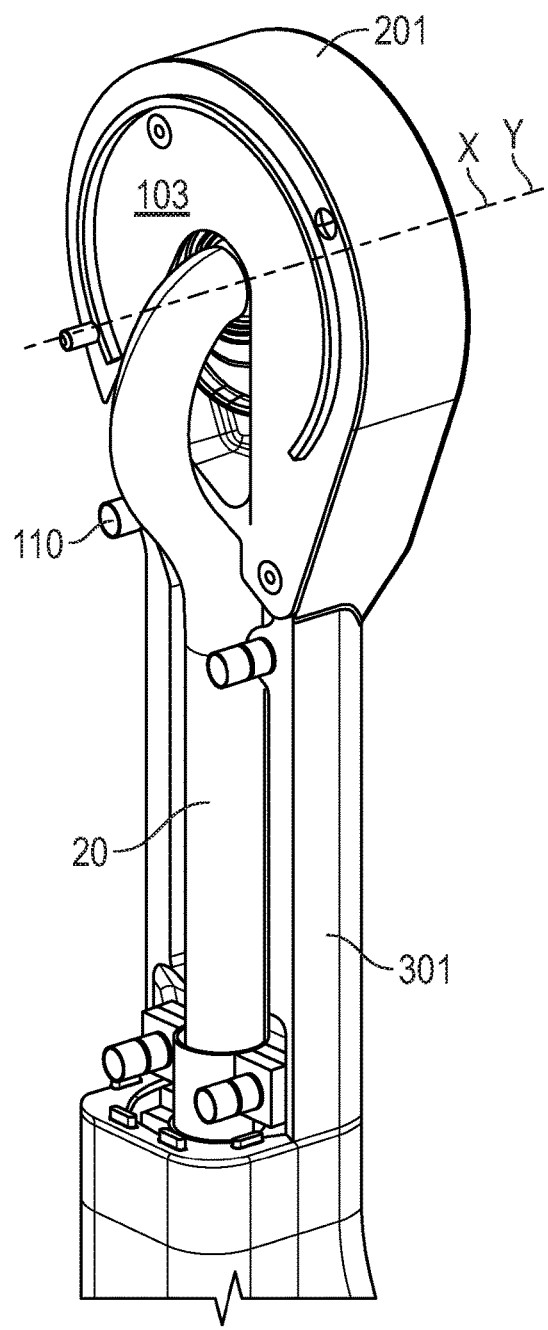
FIG. 11B is a partial perspective view of the articulating arm assembly of FIG. 1A.

As shown in FIGS. 6 and 9, the wiring 20 passes through the arm body 301 and then turns approximately 90° when the wiring 20 reaches the rotation portion 101 such that the wiring extends approximately parallel to the rotation axis X of the rotation portion 101. The wiring 20 exits the rotation portion 101 through opening 103.1 of the friction plate 103 and enters the internal cavity 201.1 of the static portion 201. As shown in FIG. 9, in some embodiments, the wiring 20 extends between the rotation portion 101 and the static portion 201 along an axis Y that is offset from and parallel to axis X (i.e., the pivot axis of rotation portion 101). In some embodiments, as shown in FIGS. 11A and 11B, the wiring 20 extends between the rotation portion 101 and the static portion 201 along an axis Y that is coincident with axis X. In other words, in some embodiments, the wiring 20 extends through the center hole 102.1 of the bearing 102. In these embodiments, the center hole 102.1 of the bearing 102 is large enough to accommodate the wiring 20.

The arrangements described above where wiring 20 extends parallel to the pivot axis of the rotation portion 101 allows the wiring 20 to be arranged such that the primary deformations caused by movement of the articulating arm cause twisting of the wiring 20. Twisting and associated deformations are preferable to repeated bending, which causes failure (such as cracking due to fatigue). In contrast to the arrangements described above, conventional articulating arm assemblies arrange wiring 20 such that it must bend when the articulating arm moves (see FIGS. 12A and 12B where the wiring 20 is arranged in a plane perpendicular to the rotation axis of the arm). Thus, the arrangements described above (which minimize bending) increase the expected life of the articulating arm assembly when compared to conventional articulating arm assemblies.

The components of the articulating arm assembly may be formed of materials including, but not limited to, machined aluminum, Teflon, plastic, aluminum sheetmetal, carbon composite, plastic, thermoplastic, steel, other aluminum material, stainless steel, other plastic or polymer materials, other metallic materials, other composite materials, or other similar materials. Moreover, the components of the seat may be attached to one another via suitable fasteners, which include, but are not limited to, screws, bolts, rivets or other mechanical or chemical fasteners.

In the following, further examples are described to facilitate understanding of aspects of the invention:

Example A

An articulating arm assembly for a passenger seat comprising:
a static portion attached to the passenger seat;
a rotation portion attached to the static portion such that the rotation portion pivots about a rotation axis;
an arm body attached to the rotation portion, the rotation portion and the arm body comprise a stowed position and a deployed position; and
a wiring portion disposed inside the arm body and extending from the arm body into the rotation portion,
wherein the wiring portion disposed such that it extends parallel to the rotation axis from the rotation portion toward and into the static portion.

Example B

The articulating arm assembly of Example A or any of the preceding or subsequent examples, further comprising a bearing disposed within an internal cavity of the rotation portion.

Example C

The articulating arm assembly of Example B or any of the preceding or subsequent examples, wherein the bearing comprises a one-way bearing that secures the rotation portion and the arm body in at least one of (i) the deployed position and (ii) a position between the stowed position and the deployed position.

Example D

The articulating arm assembly of Example A or any of the preceding or subsequent examples, further comprising a friction plate disposed between the static portion and the rotation portion.

Example E

The articulating arm assembly of Example D or any of the preceding or subsequent examples, wherein the friction plate comprises an opening that is at least partially triangular.

Example F

The articulating arm assembly of Example D or any of the preceding or subsequent examples, wherein the friction plate comprises at least one trim ring that extends toward at least one of the static portion and the rotation portion.

Example G

The articulating arm assembly of Example A or any of the preceding or subsequent examples, wherein the wiring portion extends along an axis that is coincident with the rotation axis from the rotation portion toward and into the static portion.

Example H

The articulating arm assembly of Example A or any of the preceding or subsequent examples, wherein:
the static portion comprises a main portion and a housing portion; and
the housing portion comprises a recessed area that is at least partially cylindrical and approximately corresponds to an external surface of the rotation portion.

Example I

The articulating arm assembly of Example A or any of the preceding or subsequent examples, wherein:
the static portion comprises a plunger and at least one spring; and
the at least one spring causes the plunger to push the rotation portion away from the stowed position.

Example J

The articulating arm assembly of Example A or any of the preceding or subsequent examples, further comprising a release mechanism wherein the release mechanism comprises a release pin disposed in the static portion such that a distal end of the release pin engages at least one hole of the rotation portion to secure the rotation portion and the arm body relative to the static portion.

Example K

The articulating arm assembly of Example J or any of the preceding or subsequent examples, wherein the at least one hole of the rotation portion corresponds to the stowed position.

Example L

A passenger seat comprising:
an articulating arm assembly comprising a stowed position and a deployed position, wherein the articulating arm assembly comprises:
a static portion;
a rotation portion attached to the static portion such that the rotation portion pivots about a rotation axis;
an arm body attached to the rotation portion, wherein the rotation portion and the arm body rotate about the rotation axis relative to the static portion; and
a wiring portion disposed inside the arm body and extending from the arm body into the rotation portion, wherein the wiring portion disposed such that it extends parallel to the rotation axis from the rotation portion toward and into the static portion.

Example M

The passenger seat of Example L or any of the preceding or subsequent examples, wherein the articulating arm assembly further comprises a bearing disposed within an internal cavity of the rotation portion.

Example N

The passenger seat of Example M or any of the preceding or subsequent examples, wherein the bearing comprises a one-way bearing that secures the rotation portion and the arm body in at least one of (i) the deployed position and (ii) a position between the stowed position and the deployed position.

Example O

The passenger seat of Example L or any of the preceding or subsequent examples, wherein the articulating arm assembly further comprises a friction plate disposed between the static portion and the rotation portion.

Example P

The passenger seat of Example O or any of the preceding or subsequent examples, wherein the friction plate comprises at least one of:
an opening that is at least partially triangular; and
at least one trim ring that extends toward at least one of the static portion and the rotation portion.

Example Q

The passenger seat of Example L or any of the preceding or subsequent examples, wherein the wiring portion extends along an axis that is coincident with the rotation axis from the rotation portion toward and into the static portion.

Example R

The passenger seat of Example L or any of the preceding or subsequent examples, wherein:
the static portion comprises a main portion and a housing portion; and
the housing portion comprises a recessed area that is at least partially cylindrical and approximately corresponds to an external surface of the rotation portion.

Example S

The passenger seat of Example L or any of the preceding or subsequent examples, wherein:
the static portion comprises a plunger and at least one spring; and
the at least one spring causes the plunger to push the rotation portion away from the stowed position.

Example T

The passenger seat of Example L or any of the preceding or subsequent examples, wherein the articulating arm assembly further comprises a release mechanism, wherein the release mechanism comprises a release pin disposed in the static portion such that a distal end of the release pin engages at least one hole of the rotation portion to secure the rotation portion and the arm body relative to the static portion.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An articulating arm assembly for a passenger seat, the articulating arm assembly comprising:
a static portion attachable to the passenger seat;
a rotation portion attached to the static portion such that the rotation portion is pivotable about a rotation axis, wherein the static portion defines a first end of the articulating arm assembly along the rotation axis and wherein the rotation portion defines a second end of the articulating arm assembly along the rotation axis;
an arm body attached to the rotation portion, wherein the rotation portion and the arm body are movable between a stowed position and a deployed position; and
a wiring portion disposed inside the arm body and extending from the arm body into the rotation portion, wherein the wiring portion is disposed such that the wiring portion extends parallel to the rotation axis from the rotation portion toward and into the static portion,
wherein the static portion comprises a main portion and a housing portion having a cavity, wherein the main portion defines an internal cavity having a depth along the rotation axis and configured to receive a pin, the housing portion comprising a recessed area that is at least partially cylindrical, is outside of the internal cavity of the main portion, and corresponds to an external surface of the rotation portion,
wherein the static portion further comprises a plunger and a spring located within the cavity of the housing portion, and
wherein the spring is configured to cause the plunger to push the rotation portion away from the stowed position.

2. The articulating arm assembly of claim 1, further comprising a bearing disposed within an internal cavity of the rotation portion.

3. The articulating arm assembly of claim 2, wherein the bearing comprises a one-way bearing that secures the rotation portion and the arm body in at least one of (i) the deployed position or (ii) a position between the stowed position and the deployed position.

4. The articulating arm assembly of claim 1, further comprising a friction plate disposed between the static portion and the rotation portion.

5. The articulating arm assembly of claim 4, wherein the friction plate comprises an opening that is at least partially triangular.

6. The articulating arm assembly of claim 4, wherein the friction plate comprises a trim ring that extends toward at least one of the static portion or the rotation portion.

7. The articulating arm assembly of claim 1, further comprising a release mechanism, wherein the release mechanism comprises a release pin disposed in the static portion such that a distal end of the release pin engages a hole of the rotation portion to secure the rotation portion and the arm body relative to the static portion.

8. The articulating arm assembly of claim 7, wherein the distal end of the release pin is retained within the hole of the rotation portion when the articulating arm assembly is in the stowed position.

* * * * *